US008739742B2

(12) United States Patent
Waters

(10) Patent No.: US 8,739,742 B2
(45) Date of Patent: Jun. 3, 2014

(54) CLASP

(76) Inventor: Michael Neville Waters, Townsville (AU)

( * ) Notice: Subject to any disclaimer, the term of this patent is extended or adjusted under 35 U.S.C. 154(b) by 752 days.

(21) Appl. No.: 12/936,283

(22) PCT Filed: Apr. 3, 2009

(86) PCT No.: PCT/AU2009/000413
§ 371 (c)(1),
(2), (4) Date: Apr. 19, 2011

(87) PCT Pub. No.: WO2009/121146
PCT Pub. Date: Oct. 8, 2009

(65) Prior Publication Data
US 2011/0185983 A1    Aug. 4, 2011

(30) Foreign Application Priority Data

Apr. 4, 2008 (AU) ................................ 2008201529

(51) Int. Cl.
A62B 35/00 (2006.01)
A44B 1/04 (2006.01)
A44B 11/12 (2006.01)
A44B 11/25 (2006.01)
A44B 17/00 (2006.01)
B68B 5/00 (2006.01)

(52) U.S. Cl.
USPC .......................................... 119/863; 24/170

(58) Field of Classification Search
USPC ............. 119/863; 24/170, 334, 587.1, 587.12
See application file for complete search history.

(56) References Cited

U.S. PATENT DOCUMENTS

| 3,013,317 | A | * | 12/1961 | Weber | 24/637 |
| 3,402,439 | A | | 9/1968 | Currat et al. | 24/194 |
| 5,161,351 | A | * | 11/1992 | Woodruff | 54/6.1 |
| 5,579,563 | A | * | 12/1996 | Sim | 24/587.12 |
| 5,791,688 | A | | 8/1998 | Koledin | 280/808 |
| 6,219,889 | B1 | * | 4/2001 | Lovato et al. | 24/587.1 |
| 6,715,449 | B1 | | 4/2004 | Jordan | 119/863 |
| 7,165,380 | B2 | * | 1/2007 | Oyster et al. | 54/85 |
| 2003/0037417 | A1 | * | 2/2003 | Shen et al. | 24/334 |
| 2008/0010786 | A1 | * | 1/2008 | Huang | 24/170 |
| 2008/0010791 | A1 | * | 1/2008 | Huang | 24/68 CD |

FOREIGN PATENT DOCUMENTS

JP    2003-159103    6/2003

OTHER PUBLICATIONS

Search report for Chinese Patent Application No. 200980120763.7.

* cited by examiner

Primary Examiner — Monica Williams
(74) Attorney, Agent, or Firm — Stein IP, LLC

(57) ABSTRACT

A clasp having a body defining at least one passageway extending at least partially therethrough, engagement means pivotally mounted across the body and adapted to engage an object located in said at least one passageway, and actuation means in communication with the engagement means and biased in the engaged condition, wherein actuation of said actuation means causes the engagement means to disengage from the object against the biasing force.

4 Claims, 4 Drawing Sheets

CLASP

CROSS-REFERENCE TO RELATED APPLICATIONS

This application claims the benefit of PCT International Patent Application No. PCT/AU2009/000413, filed Apr. 3, 2009, and Australian Patent Application No. 2008201529, filed Apr. 4, 2009, in the Australian Patent Office, the disclosures of which are incorporated herein by reference.

BACKGROUND OF THE INVENTION

1. Field of the Invention

The present invention relates to a clasp. In particular, the present invention relates to a clasp for use with such devices as collars or belts.

2. Description of the Related Art

Clasps are used for a wide variety of applications, such as collars for animals, safety belts (or other safety devices), clothing and so on. However, existing clasps suffer from the drawback that, if the same device is used by two different people, it will most likely need to be adjusted so as to fit the second person. This is fiddly, time-consuming and may result in, for instance, excess lengths of belt dangling from the device which is both unsightly and potentially hazardous.

Similarly, due to the nature of existing clasps, animal collars or belts for clothing are constructed in particular sizes, meaning that as a person or animal grows, the belt or collar must either be adjusted manually (e.g. by adding additional holes to the belt or collar) or replaced if the belt or collar becomes to small for the person or animal.

Thus, there would be an advantage if it were possible to provide a clasp which allowed a belt, collar or other similar device to be easily and quickly adjusted when the same device is used by people or animals of different size.

It will be clearly understood that, if a prior art publication is referred to herein, this reference does not constitute an admission that the publication forms part of the common general knowledge in the art in Australia or in any other country Throughout this specification, the term "comprising" and its grammatical equivalents shall be taken to have an inclusive meaning unless the context of use indicates otherwise.

SUMMARY OF THE INVENTION

It is an object of the present invention to provide a clasp which may overcome at least some of the abovementioned disadvantages, or provide a useful or commercial choice.

In one aspect, the invention resides broadly in a clasp having a body defining at least one passageway extending at least partially therethrough, engagement means pivotally mounted across the body and adapted to engage an object located in said at least one passageway, and actuation means in communication with the engagement means and biased in the engaged condition, wherein actuation of said actuation means causes the engagement means to disengage from the object against the biasing force.

In use, the clasp of the present invention will be used in association with an elongate flexible member. Importantly, the clasp of the invention may be fixed to a portion of the member or alternatively, may be at least temporarily fixed in position via the engagement means only. The clasp may be removable from the member entirely and the member may be moved through the at least one passageway with or without restriction apart from the engagement means.

Typically, the clasp will be used in one of two main situations, namely, more or less permanently attached to an end of the elongate member with another portion of the member engaged by the engagement means or alternatively, as a clasp which is fixed in position by the engagement means along the length of the elongate member.

The body of the clasp may be of any suitable shape, size or configuration. In some embodiment of the invention, the body of the clasp comprises one or more walls, the interior of the one or more walls of the body serving to define at least one passageway extending at least partially therethrough. In a preferred embodiment of the invention, the body of the clasp comprises a bottom wall and a pair of sidewalls extending therefrom.

Preferably, the body of the clasp comprises one or more inlets into which an object may be inserted. In some embodiments of the invention, the body of the clasp further comprises one or more outlets. Thus, in these embodiments of the invention, the at least one passageway extends entirely through the body of the clasp, with the at least one inlet defining one end of the passageway and the at least one outlet defining a second end of the passageway. Whilst the passageway may be of any suitable configuration (curved, tortuous or the like), it is preferred that the passageway is substantially straight.

In some embodiments of the present invention, the one or more inlets may be provided with guide means in order to assist a user with correctly inserting an object into the passageway. The guide means may be of any suitable size, shape and configuration. The guide means may be constructed as a single piece or may comprise a number of individual components. The guide means may be formed integrally with the body of the clasp, or may be formed separately and attached to the body of the clasp using any suitable technique.

Preferably, the guide means is located adjacent said one or more inlets and extends at least partially across said one or more inlets. In some embodiments of the invention, the guide means may extend entirely across the one or more inlets and be adapted for either permanent or temporary connection to each of the pair of sidewalls.

In a specific embodiment of the invention, the guide means comprises an elongate member in the form of a plate. In this specific configuration of the invention, a first end of the plate is located at an outer edge of the body such that the body and the plate together define the inlet of the clasp. The first end of the plate extends between upper ends of the sidewalls of the body.

It is envisaged that the plate will extend from the outer edge of the body into the interior of the body. In this configuration, the plate is located at an angle to the bottom wall such that the passageway formed between the plate and the bottom wall narrows along the length of the plate as the plate extends into the body. In embodiments of the invention in which the plate is substantially flat, it is envisaged that the passageway may narrow at a uniform rate along the length of the plate. Alternatively, the plate may be curved, meaning that the rate at which the passageway narrows may vary along the length of the plate.

In some embodiments of the invention, the guide means may further extend at least partially into the passageway. In a preferred embodiment, as it extends into the passageway the guide means may be disposed at an angle to the bottom wall of the passageway, such that the passageway tapers or narrows along at least a portion of its length between the one or more inlets and the one or more outlets. The guide means may be straight, curved or a combination thereof as it extends into the body of the clasp.

The actuation means may be of any suitable form. As previously stated, the actuation means is in communication with the engagement means, and the communication between the actuation means and the engagement means may be achieved using any suitable technique. The actuation means may communicate either directly or indirectly with the engagement means. For instance, the actuation means may be located remotely from the engagement means (or even remotely from the clasp), or the actuation means and the engagement means may be physically connected to one another, either temporarily or permanently.

In some embodiments of the invention, the actuation means comprises a lever, button, switch, latch, or the like. The actuation means may be located remotely from the clasp or may be mounted permanently or temporarily to the body of the clasp. The actuation means may be formed integrally with the body of the clasp or may be formed separately and subsequently mounted thereto using any suitable technique. In some embodiments of the invention, at least a portion of the actuation means may form at least a portion of an upper wall of the body of the clasp.

In a preferred embodiment of the invention, the actuation means are biased in the engaged condition. By this it is meant that, when the actuation means is not being actuated, the actuation means are biased such that the engagement means are in position to engage an object. Preferably, when the engagement means are in position to engage an object, the engagement means are located within the passageway. In some embodiments of the invention, when the engagement means are located in the passageway (i.e. when the actuation means is in the biased condition), the passageway may be at least partially blocked by the engagement means. Preferably, when the engagement means are located in the passageway, an object cannot pass through the passageway due to the obstacle caused by the location of the engagement means. The actuation means may be biased in this condition using any suitable biasing means, such as a compressible tube or the like. In a preferred embodiment of the invention, however, the biasing means comprises one or more springs.

In a preferred embodiment of the invention, the biasing force of the biasing means may be overcome by manual pressure applied by a user's fingers or hands. However, depending on the application to which the invention is applied, it may be preferable that a greater (or lesser) force than this is required to overcome the biasing force and actuate the actuation means.

In some embodiments of the invention, actuation of the actuation means may result in the engagement means moving such that it no longer obstructs the passageway. In this way, upon actuation of the actuation means, an object may be inserted into, and pass through, the passageway. When the actuation of the actuation means is released, the actuation means are biased so as to return the engagement means to the engaged condition within the passageway, whereupon, if an object has been inserted into the passageway, the engagement means engages with said object to retain it in place. In some embodiments of the invention, this movement of the engagement means is achieved by mounting the engagement means and the actuation means so as to be pivotally mounted to the body of the clasp. Thus, actuation of the actuation means causes the engagement means to pivot about a pivot point such that the engagement means is pivoted out of the passageway.

In some embodiments of the invention, the actuation means may be provided with one or more indicia to instruct a user in how to actuate the actuation means. The one or more indicia may be in the form of words, letters, numbers, symbols, pictures, colours or any combination thereof.

The engagement means may be of any suitable form to create a sufficient engagement between the engagement means and the object to prevent the object from moving without the engagement means being disengaged. The physical engagement may be achieved using any suitable technique such as by abutting, a frictional engagement, a pin and slot arrangement, a clamping motion or a combination thereof.

The engagement means may be provided with one or more projections (teeth, hooks, spikes or the like), an adhesive, Velcro or the like (or any combination thereof) that may physically engage and hold the object during use.

In some embodiments of the invention, the engagement means may comprise an array of projections. The array of projections may be provided on a member which extends transversely across at least a portion of the passageway. When the engagement means is in the engaged position, the array of projections may extend at least partially into the passageway. In this way, the array of projections may engage with at least a portion of the width of an object located in the passageway.

In a preferred embodiment of the invention, the actuation of the actuation means may cause the array of projections to move such that the array of projections does not project into the passageway. In this manner, the array of projections may be disengaged from the object located in the passageway so that the object may be removed from the passageway or have its position adjusted. In addition, by moving the array of projections out of the passageway, an object may be inserted into the passageway if required.

In a preferred embodiment of the invention, the member on which the array of projections is provided may be in communication with the actuation means. Preferably, the member is connected, either fixedly or removably, to the actuation means.

In a preferred embodiment of the invention, the clasp may be provided with attachment means. The attachment means may be of any suitable form, shape, size or configuration. The attachment means may be adapted to allow a item to be permanently or temporarily attached thereto (such as an animal leash, identification tag or the like)

The object located in the passageway may be any suitable object. In some embodiments of the invention, however, the object comprises one or more elongate members, such as a belt or strap for clothing, a belt or strap for safety equipment (e.g. a vehicle or aeroplane seatbelt, a safety harness strap or the like), a cord, rope, chain or a collar for an animal and so on. Alternatively, in situations in which the clasp is held in a fixed position, the attachment means may be used to attach the clasp to a any suitable fixed object. The attachment means may comprise a hook, loop, screw, bolt, clamp, projection or the like, or any combination thereof.

The clasp may be constructed from any suitable material, such as metal, plastic, fiberglass or the like. The individual components of the clasp may be constructed from the same, or different materials. The clasp may be manufactured in a variety of sizes or shapes, depending on the application in which it is to be used.

In another aspect, the invention resides broadly in a collar, the collar comprising at least one elongate member and a clasp having a body defining at least one passageway extending at least partially therethrough, engagement means pivotally mounted across the body and adapted to engage an object located in said at least one passageway, and actuation means in communication with the engagement means and biased in the engaged condition, wherein actuation of said actuation means causes the engagement means to disengage from the object against the biasing force.

Preferably, the elongate member comprises a strap (such as a metal, fabric, plastic or leather strap), rope, cord, belt, chain or the like. Preferably, the elongate member comprises the portion of the collar that is placed around the neck of the wearer. Although the term "collar" has been used in this context, the skilled addressee will understand that the collar could equally be applied to a wearer's arm, leg, torso, waist, head or any other suitable location.

In a most preferred embodiment of the invention, the collar is a collar for an animal.

In yet another aspect, the invention resides broadly in a method of attaching a collar to an animal, the method comprising the steps of actuating an actuation means located on a clasp provided on said collar, inserting an elongate portion of the collar into the clasp, releasing the actuation means when the elongate portion has been inserted a sufficient distance into the clasp, wherein releasing the actuation means causes an engagement means to engage with the elongate portion, thereby preventing the elongate portion from moving when in use.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
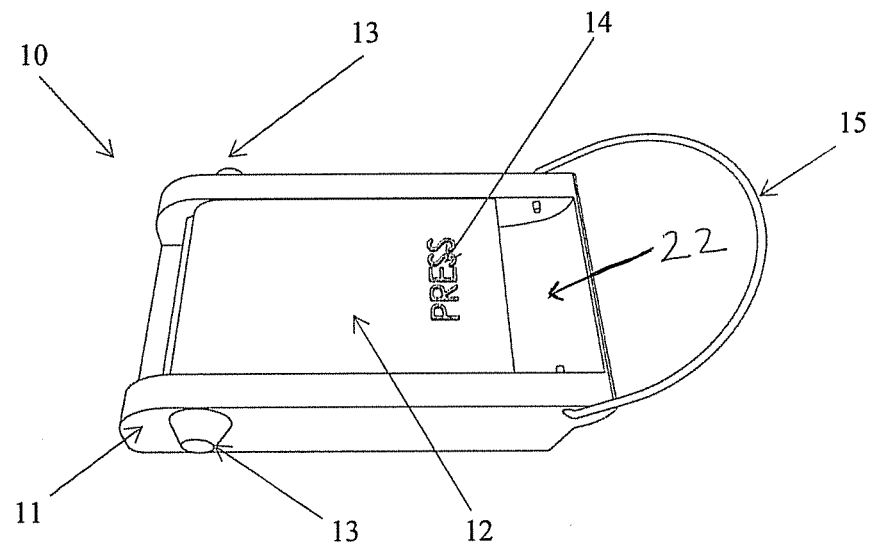
FIG. 1 illustrates a clasp according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It will be appreciated that the drawings have been provided for the purposes of illustrating preferred embodiments of the present invention and that the invention should not be considered to be limited solely to the features as shown in the drawings.

In FIG. 1 there is shown a clasp 10 according to an embodiment of the present invention. The clasp 10 comprises a body 11 and actuation means 12 pivotally attached to the body 11 at a pair of pivot points 13. The actuation means 12 comprises indicia 14 in the form of a word to indicate to the user how the actuation means 12 is operated. The actuation means 12 as shown in FIG. 1 are held in the engaged position by a biasing force applied by biasing means (obscured) in the form of a spring.

The clasp 10 further comprises attachment means in the form of a loop 15 to which another object (such as a leash, identification tag or the like) may be attached.

Figure 2:
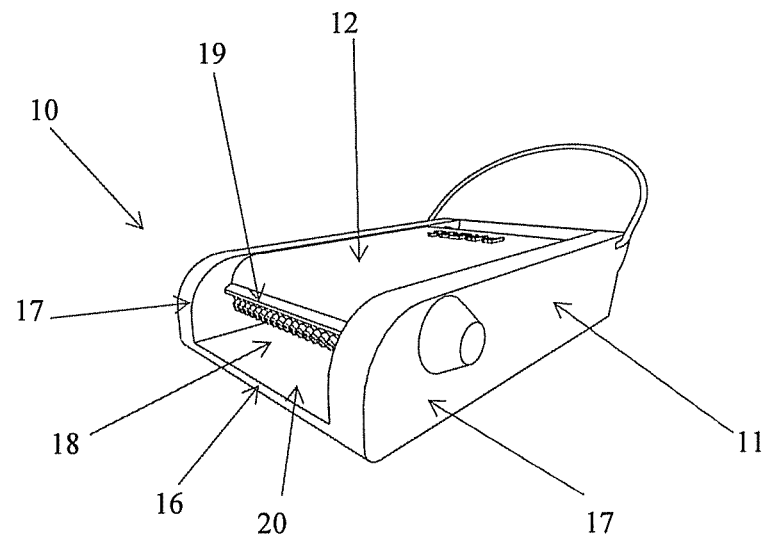
FIG. 2 illustrates a clasp according to an embodiment of the present invention.

In FIG. 2 a perspective view of the clasp 10 is shown. In this Figure it may be seen that the body 11 comprises a bottom wall 16 and a pair of sidewalls 17 which extend upwardly from the bottom wall 16. The bottom wall 16 and side walls 17 define a passageway 18 into which an object (not shown) may be inserted. The actuation means 12 serves to define an upper wall of the passageway 18.

In the embodiment of the invention illustrated, the actuation means 12 is provided with engagement means in the form of a plurality of teeth 19, the teeth 19 being adapted to hold and retain an object (not shown) within the passageway 18 adjacent the outlet 20 of the passage way 18.

Figure 3:
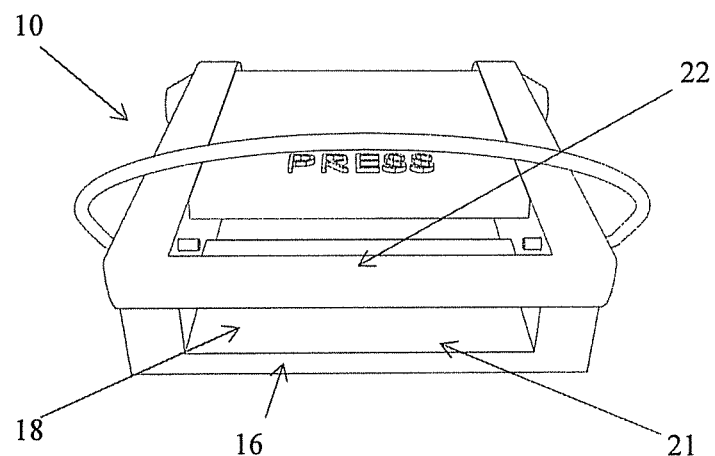
FIG. 3 illustrates a clasp according to an embodiment of the present invention.

In FIG. 3 the inlet 21 of the passageway 18 may be seen. Guide means 22 are provided across the inlet 21 and extending into the passageway 18 in order to assist a user in guiding an object (not shown) into the passageway 18. The guide means 22 are disposed at an angle to the bottom wall 16 such that the passageway 18 narrows or tapers as it extends into the clasp 10 from the inlet 21.

Figure 4:
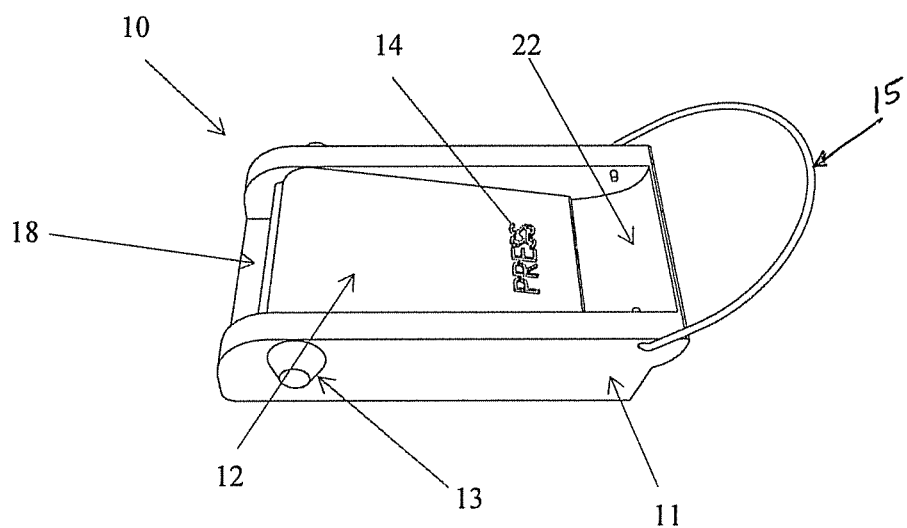
FIG. 4 illustrates a clasp according to an embodiment of the present invention.

In FIG. 4, the actuation of the actuation means 12 is illustrated. When a user exerts a downward pressure on a point of the actuation means 12 adjacent the indicia 14, the end of the actuation means 12 closest to the inlet (obscured) of the clasp 10 pivots downwardly towards the guide means 22.

The pivoting of the actuation means 12 around the pivot points 13 causes the engagement means (obscured) to pivot upwardly, thereby removing any obstacles from the passageway 18 and allowing an object (not shown) to be inserted into and through the body 11 of the clasp 10.

Figure 5:
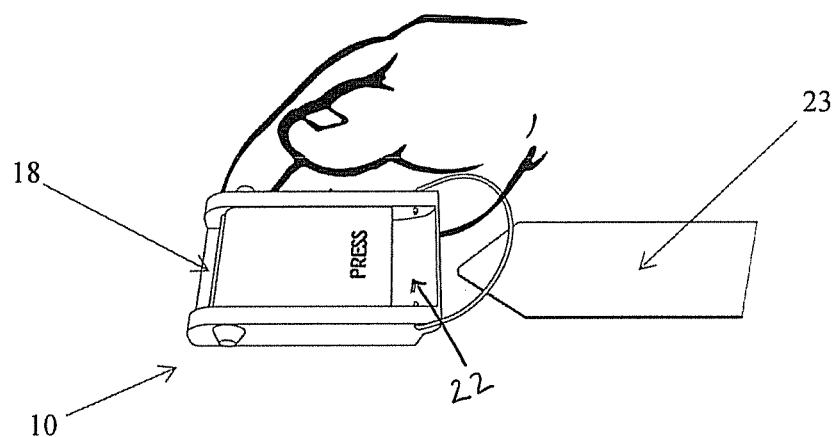
FIGS. 5-7 illustrate a method of using a clasp according to an embodiment of the present invention.
Figure 6:
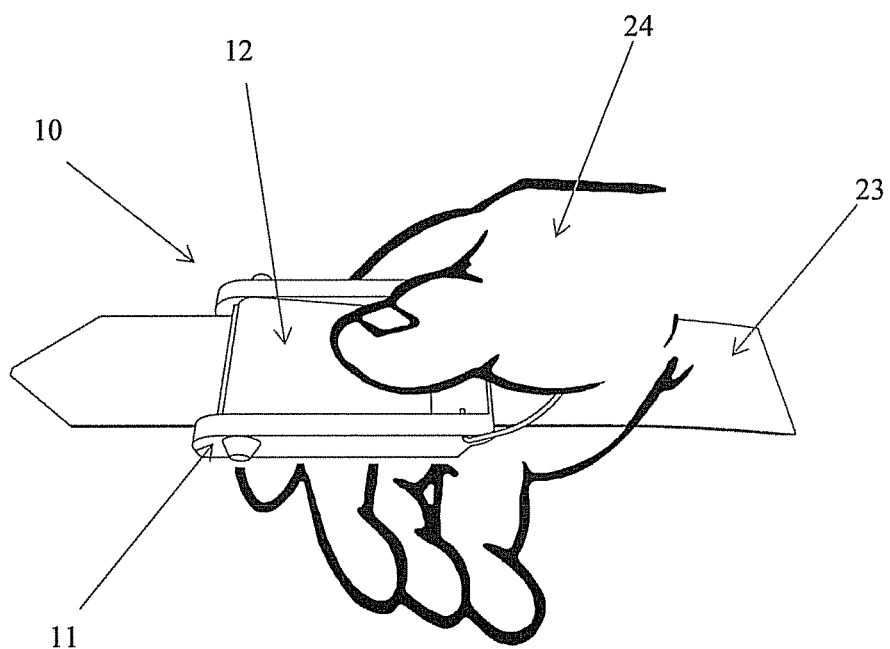
Figure 7:
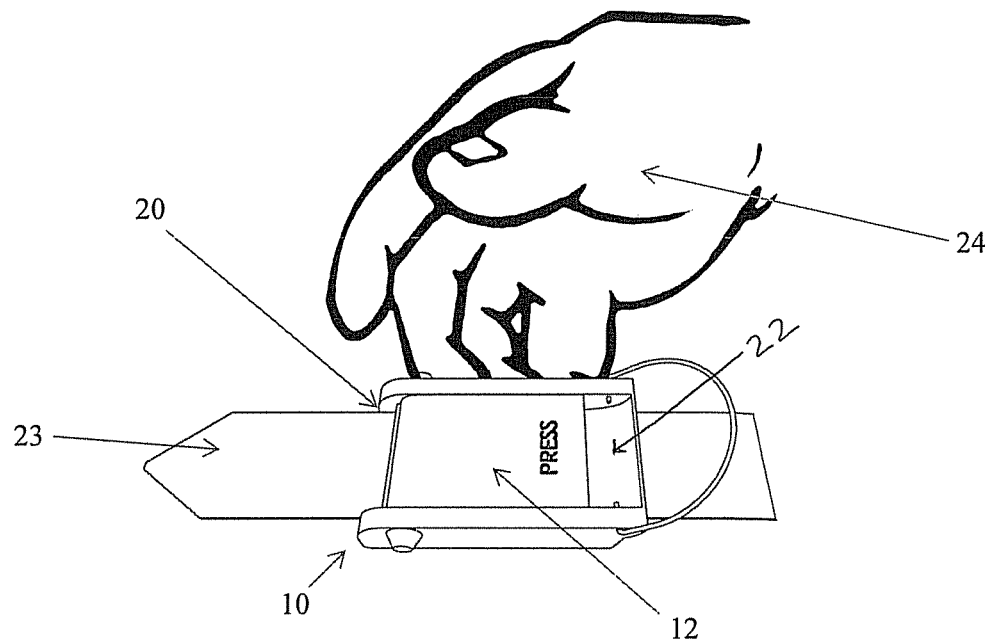

Turning now to FIGS. 5 to 7, there is shown the steps in the method of using the clasp 10 according to an embodiment of the invention when it is attached to an elongate member 23, such as a belt, collar, strap or the like.

In FIG. 5, the elongate member 23 is aligned with the inlet (obscured) in preparation for inserting the elongate member 23 into the passageway 18.

In FIG. 6, a user 24 exerts downward pressure on the actuation means 12 such that the engagement means (obscured) is pivoted upwardly out of the passageway (obscured). The elongate member 23 may now be inserted into the inlet (obscured) and pushed through the body 11 of the clasp 10 along the passageway (obscured) until it exits the clasp 10 through the outlet (obscured).

In FIG. 7, the user 24 adjusts the elongate member 23 such that the desired length has been fed through the clasp 10. Once satisfied, the user 24 releases the pressure on the actuation means 12 resulting in the engagement means (obscured) pivoting downwardly to engage and hold the elongate member 23 at a point adjacent the outlet 20. Once in this position, the elongate member 23 cannot move from its position within the clasp 10 due to the strength of the engagement between the engagement means (obscured) and the elongate member 23.

Figure 8:
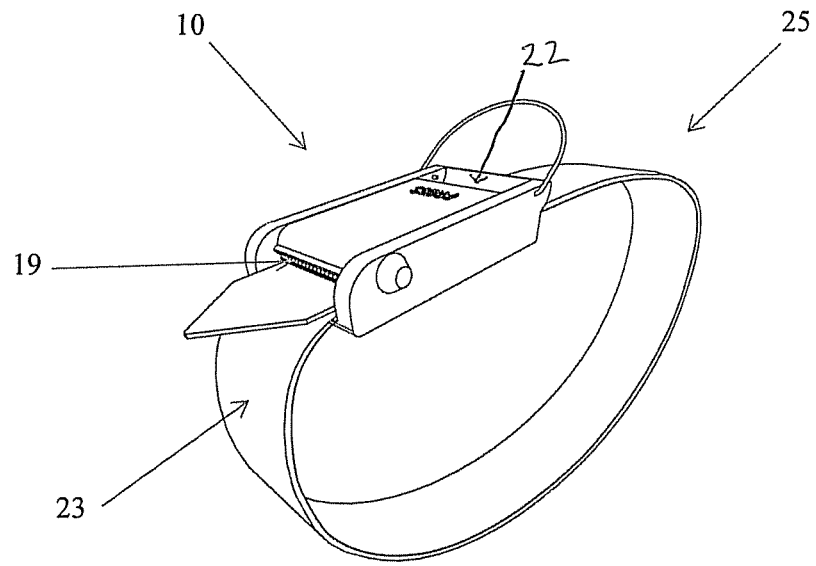
FIG. 8 illustrates a collar according to an embodiment of the present invention.

In FIG. 8, an animal collar 25 according to an embodiment of the present invention is shown. The collar 25 includes a clasp 10 and an elongate member 23 which is passed through and held within the clasp 10 by the engagement means 19.

Those skilled in the art will appreciate that the present invention may be susceptible to variations and modifications other than those specifically described. It will be understood that the present invention encompasses all such variations and modifications that fall within its spirit and scope.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A clasp having a body defining at least one passageway extending therethrough from an inlet at one end of the body to an outlet at the second, opposite end of the body, said body comprising a bottom wall, one or more walls extending upward from said bottom wall, the interior of the one or more walls serving to define the passageway, engagement means pivotally mounted across the body and adapted to engage an elongate member located in said at least one passageway, actuation means in communication with the engagement means and biased in the engaged condition, wherein actuation of said actuation means causes the engagement means to disengage from the elongate member against the biasing force, and guide means separating the actuation means from an inlet of the passageway, the guide means comprising a plate having a first end located at an outer edge of the body such that the body and the guide means together define the inlet, and wherein the guide means is adapted to cause the passageway to narrow along the length of the guide means as the plate extends into the body from the inlet, said second end of said body adapted to secure the elongate member to the body of the clasp.

2. A clasp according to claim 1 wherein the engagement means is connected to the actuation means and comprises one or more projections that engage with the elongate member when in use.

3. A clasp according to claim 1 wherein actuating the actuation means causes the engagement means to disengage from the elongate member.

4. A method of attaching a collar to an animal, said collar comprising a clasp and an elongate member, the method comprising the steps of actuating an actuation means located on a clasp provided on said collar, said clasp having a body defining a passageway extending from a first end of the body to a second end of the body, said body comprising one or more walls, the interior of said walls serving to define a passageway, securing an end of said elongate member to said clasp at the second end of the body of the clasp, inserting the opposite end of said elongate member into the clasp through an inlet separated from the actuation means by guide means, the guide means comprising a plate having a first end located at an outer edge of the body such that the body and the guide means together define the inlet, and wherein the guide means is adapted to cause the passageway to narrow along the length of the guide means as the plate extends into the body from the inlet, toward the second end of said body of the clasp, releasing the actuation means when the elongate member has been inserted a sufficient distance into the clasp, wherein releasing the actuation means causes an engagement means to engage with the elongate member, thereby preventing the elongate member from moving when in use.

* * * * *